3,306,925
PROCESS FOR BRANCHED CYCLIC SILOXANES
George M. Omietanski, Tonawanda, N.Y., assignor to Union Carbide Corporation, a corporation of New York
No Drawing. Filed Apr. 29, 1963, Ser. No. 276,174
5 Claims. (Cl. 260—448.2)

This invention relates to a process for the production of branched cyclic organopolysiloxanes. More particularly it relates to the process of reacting an acyloxy- or halo-siloxane with water in the presence of an inert organic solvent and an amine acid acceptor. The branched cyclic organopolysiloxane products have superior low temperature properties in addition to having desirable high temperature properties.

Organopolysiloxane fluids are known to possess desirable high temperature properties. Their use at relatively low temperatures has been limited, however, by their relatively high freezing points or crystallization temperatures and high viscosities at low temperatures. Attempts have been made in the prior art to improve the low temperature properties of organopolysiloxane fluids by introducing bulky groups or branches to the regular structure of the organopolysiloxane. This introduction of new groups is generally accomplished by copolymerization of monomer mixtures or equilibration techniques. The resulting branched organosiloxanes prepared by equilibration contain a random distribution of long and short branched chains. While these compounds have some improvement in the general low temperature properties, they still leave much to be desired in regard to such properties.

I have now found that branched cyclic polysiloxanes of specific desired composition having non-random, ordered structure can be prepared which have superior low temperature properties, such as lower pour points or freezing points and lower viscosities than prior art siloxane of the same weight average molecular weight. Such materials also have high temperature properties which are equal to or better than those of prior art organosiloxanes of the same bulk viscosity. These novel branched cyclic organosiloxanes have the formula:

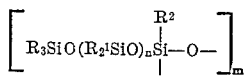

wherein R, $R^1$ and $R^2$ are nonvalent hydrocarbyl radicals, $m$ is an integer having a value of 3 to 5 inclusive and $n$ is an integer having a value of 1 to 6 inclusive. These compounds are disclosed and claimed in my application Serial Number 276,171 filed concurrently herewith.

The present invention relates to an improved process for preparing the above-mentioned branched cyclic organopolysiloxanes. This process comprises reacting an organosiloxane having the formula:

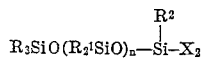

with water in the presence of an inert organic solvent and an amine acid acceptor, wherein R, $R^1$ and $R^2$ are monovalent hydrocarbyl radicals, $n$ is an integer having a value of 1 to 6 inclusive, and X is selected from the class consisting of halogen radicals and acyloxy radicals.

The monovalent hydrocarbyl radicals which are represented by R, $R^1$ and $R^2$ in the above formula are illustrated by alkyl groups, such as methyl, ethyl, propyl, isopropyl, butyl, isobutyl, amyl, hexyl and the like; alkenyl groups, such as vinyl, allyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethylphenyl, xylyl, mesityl and the like. R, $R^1$ and $R^2$ can be the same or different radicals, and R, $R^1$ and $R^2$ are preferably methyl radicals. The halogen radicals which are represented by X in the above formula are illustrated by chloro, bromo, iodo and fluoro radicals. Chloro is the preferred radical. The acyloxy radicals which are represented by X in the above formula are illustrated by acetoxy, propionoxy, butyroxy, benzoxy and the like. Acetoxy is the preferred radical.

With reference to the above process, the amine acid acceptors are illustrated by ammonia; primary amines, such as methylamine, ethylamine, benzylamine, n-butylamine and the like; secondary amines, such as dimethylamine, diethylamine, di-isopropylamine, piperidine and the like; tertiary amines, such as trimethylamine, triethylamine, triphenylamine, methyldiethylamine, pyridine, methylethylphenylamine, 3-picoline and the like. Tertiary amines are preferred.

The reaction is carried out in the presence of an inert organic solvent. Such solvent is preferably present in an amount of about 25 to 80 volume percent based on total volume of reaction mixture. Useful solvents are acetone, benzene, toluene, tetrahydrofuran, isopropyl ether and the like. Preferably, the inert organic solvent is water-miscible, such as acetone, tetrahydrofuran and the like. The reactants can be reacted in a ratio of 1 mole of halo- or acyloxy-siloxane to 2 moles of water. Preferably an excess of water is employed. The amine acid acceptor is present in an amount of 1 mole for each mole of acid produced by the reaction between the siloxane and water. Preferably an excess of amine acid acceptor is present. While a tertiary amine is preferred, ammonia can be used, if desired, in the later stages of the reaction to drive it to completion. The process conditions are not narrowly critical. The reaction can be carried out in the temperature range of about 0° C. to about 150° C. The preferred temperature range is from about 25° C. to about 100° C.

The siloxane starting materials in the above process are prepared by well known techniques. The halo-siloxanes are prepared by the reaction between

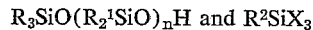

while the acloxy-siloxanes are prepared by the reaction between $R_3SiO(R_2^1SiO)_nH$ and $R^2Si(OAc)_3$ where "Ac" designates an acyl radical, such as acetyl, and where R, $R^1$, $R^2$ and ($n$) are defined above.

In an example of the process of the present invention

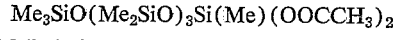

where "Me" designates a methyl radical, was reacted at ambient temperature with water in the presence of triethylamine acid acceptor and tetrahydrofuran solvent. The product was isolated by adding benzene, separating the siloxane-containing benzene layer from the remaining aqueous layer, and drying the siloxane layer over anhydrous calcium sulfate. Solvent was removed by heating to about 200° C. at atmospheric pressure. The branched cyclic siloxane product was then devolatilized by heating to about 210° C./4 mm. Hg with a nitrogen sparge. The product was identified by analysis, molar refraction and infrared spectroscopy to be a branched cyclic tetramer having the formula:

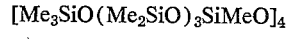

This product had a pour point of −140° F. which is substantially below the melting point of a prior art siloxane of comparable room temperature viscosity and molecular weight.

The branched cyclic organopolysiloxanes produced by the process of the present invention can be used in any manner similar to prior organopolysiloxanes, such as in lubricating oils and electronic coolants and the like. In addition to such prior art utility, these compositions of the present process invention have superior low temperature properties which greatly extend the utility of the fluids prepared therefrom to such low temperatures.

What is claimed is:

1. A process for producing branched cyclic organopolysiloxanes having non-random, ordered structure which comprises reacting an organosiloxane having the formula:

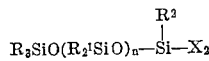

with water in the presence of an inert organic solvent and an amine acid acceptor, wherein R, $R^1$ and $R^2$ are monovalent hydrocarbyl radicals, $n$ is an integer having a value of 1 to 6 inclusive, and X is selected from the class consisting of halogen radicals and acyloxy radicals.

2. A process for producing branched cyclic organosiloxanes having non-random, ordered structure as set forth in claim 1 wherein X is a halogen radical.

3. A process for producing branched cyclic organosiloxanes having non-random, ordered structure as set forth in claim 1 wherein X is an acyloxy radical.

4. A process for producing branched cyclic organosiloxanes having non-random, ordered structure as set forth in claim 1 wherein the inert organic solvent is water-miscible.

5. A process for producing branched cyclic organosiloxanes which comprises reacting an organosiloxane having the formula $Me_3SiO(Me_2SiO)_3Si(Me)(OOCCH_3)_2$ with water in the presence of triethylamine acid acceptor and tetrahydrofuran solvent.

References Cited by the Examiner
UNITED STATES PATENTS

| | | | |
|---|---|---|---|
| 2,547,944 | 4/1951 | Iler | 260—448.2 |
| 2,623,832 | 12/1952 | MacKenzie et al. | 260—448.2 |
| 3,105,061 | 10/1963 | Bruner | 260—448.2 |

HELEN M. McCARTHY, *Acting Primary Examiner.*

SAMUEL H. BLECH, *Examiner.*

P. F. SHAVER, *Assistant Examiner.*